US006808166B2

(12) United States Patent
Hargrove, Jr. et al.

(10) Patent No.: US 6,808,166 B2
(45) Date of Patent: Oct. 26, 2004

(54) GAS DISTRIBUTION SYSTEM FOR VENTURI SCRUBBERS AND ABSORBERS

(75) Inventors: Oliver W. Hargrove, Jr., Austin, TX (US); Mark A. Denlinger, Raleigh, NC (US)

(73) Assignee: URS Corporation, San Francisco, CA (US)

( * ) Notice: Subject to any disclaimer, the term of this patent is extended or adjusted under 35 U.S.C. 154(b) by 47 days.

(21) Appl. No.: 10/202,293

(22) Filed: Jul. 24, 2002

(65) Prior Publication Data

US 2003/0020186 A1 Jan. 30, 2003

Related U.S. Application Data

(60) Provisional application No. 60/307,967, filed on Jul. 26, 2001.

(51) Int. Cl.$^7$ .................................................. B01F 3/04
(52) U.S. Cl. .............................. 261/116; 261/DIG. 54; 96/323; 96/348; 96/360; 96/368
(58) Field of Search .................... 261/116, DIG. 54; 96/257, 280, 323, 333, 348, 355, 360, 368

(56) References Cited

U.S. PATENT DOCUMENTS

| | | | | |
|---|---|---|---|---|
| 2,337,728 A | * | 12/1943 | Acton | 96/335 |
| 3,517,485 A | * | 6/1970 | Dell'agnese et al. | 96/261 |
| 3,584,440 A | * | 6/1971 | Vigil | 96/250 |
| 3,648,440 A | * | 3/1972 | Egan | 96/245 |
| 3,690,044 A | * | 9/1972 | Boresta | 96/273 |
| 3,793,809 A | * | 2/1974 | Tomany et al. | 95/211 |
| 5,484,471 A | | 1/1996 | Schwab | |
| 5,900,216 A | | 5/1999 | Nickens et al. | |
| 6,036,756 A | * | 3/2000 | Gohara et al. | 96/297 |

* cited by examiner

Primary Examiner—Scott Bushey
(74) Attorney, Agent, or Firm—Klauber & Jackson

(57) ABSTRACT

A venturi scrubber for scrubbing a gas stream to remove undesired gaseous and particulate components. The device includes a scrubber vessel having an external wall, an upper inlet for admitting the gas stream, and a collecting reservoir at the bottom of the vessel for collecting scrubbing liquid. An internal wall extends from the upper part of the external wall to define an axial converging passage for receiving and converging the gas stream from the inlet. An adjoined downwardly extending venturi passage receives the downwardly flowing gas stream from the converging passage, the internal wall abounding the venturi passage terminating above the liquid level at the reservoir; and an annular space is thereby defined between the internal and external walls. An outlet duct for the scrubbed gas stream intersects the annular space at the upper part of the space. The gas stream flowing downwardly through the converging passage and venturi passage is turned about the bottom of the internal wall to enter the annular space and proceed therein upwardly and exits the vessel through the outlet. A scrubbing slurry contacts the stream in the venturi passage. An annular mist eliminator is mounted in the annular space at an axial point below the outlet duct, and a gas diverter is mounted in the annular space below the mist eliminator to divert the gas stream which is turned upwardly into the annular space away from the external wall, whereby the upward flow through the annular space to the mist eliminator is rendered more uniform. Outlet compensating means may be provided in the annular space upstream of the outlet for impeding the flow of the gas stream to the outlet, thereby rendering the upward stream flow in the annular space more uniform.

8 Claims, 5 Drawing Sheets

GAS DISTRIBUTION SYSTEM FOR VENTURI SCRUBBERS AND ABSORBERS

RELATED APPLICATION

This application claims priority from provisional Application No. 60/307,967, filed Jul. 26, 2001.

FIELD OF INVENTION

This invention relates generally to apparatus for removing contaminants from gaseous streams, and more specifically relates to venturi scrubbers.

BACKGROUND OF THE INVENTION

One well known type of device for removing contaminants from a gaseous effluent stream (such as flue gas) is a venturi scrubber. In such device the effluent gas is flowed through a venturi tube having a narrow throat portion. As the gas moves through the throat it is accelerated to a high velocity. A scrubbing liquid or slurry is added to the venturi, usually at the throat, and enters the gas flow. The scrubbing droplets used are generally much larger than the contaminant particles or contaminant gases to be collected and, as a consequence, accelerate at a different rate through the venturi. The differential acceleration causes interactions between the scrubbing droplets and the contaminants, such that the contaminant particles or gases are collected by the droplets. The scrubbing droplets are then removed from the effluent stream which is thereby cleansed.

The inventors' experience in operations at typical power plants indicates that severe gas maldistribution can exist in certain types of venturi scrubbers and that this contributes to a number of serious equipment problems. The symptoms are slurry carryover and buildup in the scrubber mist eliminators, induced draft fans, duct work, and second stage venturi absorbers that may be currently only used for mist elimination. In such systems liquid can even escape a second venturi mist eliminator and be re-entrained into the flue gas exiting the chimney, resulting in liquid droplets falling from the plume (termed "stack rain").

The reasons for the above difficulties can be understood by reference to FIG. 1 which is a schematic block diagram depicting a prior art venturi scrubber flow system for sulfur dioxide and fly ash removal to which the present invention is applicable. FIG. 1 may be considered simultaneously with the prior art showing of FIG. 2 which depicts the venturi scrubber vessel in greater detail. The system 10 shown in FIG. 1 includes a scrubbing vessel 12 which is of a venturi-type known in the prior art. Exhaust flue gas 14 from a furnace 16 is provided to the inlet 18 of vessel 12. After being contacted with a slurry reagent which is sprayed via spray head 20 at the top of vessel 12 and by spray head 22 at an intermediate point, the flow of flue gas and spray droplets proceeds about a plumb bob body 24 and is then converged and enters the constricted venturi passage 26 where increased contact between the scrubbing slurry and flue gas is enabled. The slurry reagent 28, as for example an aqueous slurry of lime or a limestone, is fed into a slurry reservoir 30 at the bottom of vessel 12. The slurry level 32 in reservoir 30 is maintained at a relatively constant point within the bottom of the vessel. The slurry having contacted the flue gas descends to this underlying reservoir 30 where it is collected. The collected slurry is refreshed by reagent 28 and makeup water is added as needed—e.g., from wash water used for mist eliminator 50. The slurry is recirculated via the recirculation pump 34 to the spray heads 20 and 22.

The solids are recovered from the slurry via the output line 36 which proceeds to a conventional thickener 38. A valve 35 opens to admit slurry from the reservoir to thickener 38 upon the solids in the reservoir exceeding apreset point. (Controls for valve 35 are not shown.) The thickener underflow proceeds via line 40 to a disposal or collection point.

It is seen that the vessel 12 is provided with an external wall 42, and an internal wall 44 which converges in the direction of gas stream flow and then defines a boundary for the constricted venturi passage 26 by its downwardly extending portion 46. Portion 46 terminates well above the slurry level 32. Thus it is seen that the flow of the gases and entrained slurry to be scrubbed, as depicted by the large arrows 53 in FIG. 2, proceeds downwardly through venturi passage 26 and then is turned about through approximately 180° beneath the wall 46 and above the slurry level 32, and enters the annular space 48 defined between the aforementioned internal and external walls 46 and 42. The gases then proceed upwardly in annular space 48 and impact and pass through a conventional mist eliminator 50. An outlet duct 52 intersects annular space 48 at one side thereof (at the right in the sense of the drawing) and allows the gases proceeding above the mist eliminator 50 to exit and proceed via line 54 to stack 56 for discharge.

The two curves designated "current operation" in FIG. 5 depict a typical flow velocity distribution in a prior art venturi scrubber vessel of the type shown in FIGS. 1 and 2, and illustrates the gas maldistribution problem occurring for the velocities near the exterior walls of the annular space 48. The dotted curve represents results for a computerized fluid dynamics ("CFD") model for a plane 1 foot below mist eliminator 50. The curve defined by triangles depicts measured values at a plane about 5 feet below the mist eliminator 50. The parallel lines in the middle of the graph represent the downwardly extending input channel, i.e., the venturi passage 26. As seen from this graph, the flow velocity of the mist-entraining gases is vastly different in the annular space 48 depending upon whether one is considering the upward velocity of the gases adjacent internal wall 46 or the velocity as one approaches the external wall 42 of the vessel. In fact it will be noted that adjacent wall 46 the gases actually have a negative velocity indicative of eddying and swirling. Even though in the design considered the average velocity is only of the order 10 fps, the regions of high velocity typically exceed the 15 fps design velocity of the mist eliminator used in the present system, which results in slurry penetration through the mist eliminator and into downstream equipment. It is this marked nonuniformity in velocities in the annular space 48 which the present invention is intended to remedy.

SUMMARY OF INVENTION

In accordance with the present invention, a venturi scrubber is provided for scrubbing a gas stream to remove undesired gaseous components, which includes a scrubber vessel having an external wall, an upper inlet for admitting the gas stream, and a reservoir at the bottom of the vessel for collecting the scrubbing liquid sprayed into the vessel. An internal wall extends from the upper part of the external wall to define an axial converging passage for converging the gas stream from the inlet, and an adjoined downwardly extending restricted venturi passage receives the downwardly flowing gas stream from the converging passage. The internal wall abounding the venturi passage terminates above the liquid level at the reservoir. An annular space is thereby defined between the internal and external walls. An outlet duct for the scrubbed gas stream intersects the annular space at its upper reaches. The gas stream flowing downwardly through the converging passage and venturi passage is turned about the bottom of said internal wall to enter the annular space and proceeds therein upwardly and exits the vessel through the outlet duct. Spray means are provided for spraying a scrubbing liquid or slurry into the gas stream, and an annular mist eliminator is mounted in the annular space at an axial point below the outlet duct.

Pursuant to a first aspect of the invention a gas diverter means is mounted in the annular space below the mist eliminator to divert the gas stream which is turned upwardly into the annular space away from the external wall and toward the axis of the vessel, whereby the velocity of the upward flow through the annular space to the mist eliminator is rendered more uniform. The gas diverter is preferably an annular ring the transverse cross-section of which is adjacent to but slightly spaced from the external wall, and which is tilted away from the wall as to be convergent in the upward direction.

In a further aspect of the invention an outlet compensating means can be mounted in at least the sector of the annular space underlying the outlet duct, for impeding the flow of the gas stream toward the outlet and thereby compensating for the otherwise higher gas stream flow in such sector than in azimuthally displaced sectors of the annular space thereby rendering the upward stream flow in the annular space more uniform. The outlet compensating means can comprise a plate mounted above the mist eliminator and below the outlet duct, the plate having a plurality of portions closed to gas stream flow in the sector underlying the duct intersection and the plate being increasingly open to stream flow in its sectors which are azimuthally displaced from the duct intersection.

DESCRIPTION OF PREFERRED EMBODIMENT

Figure 2:
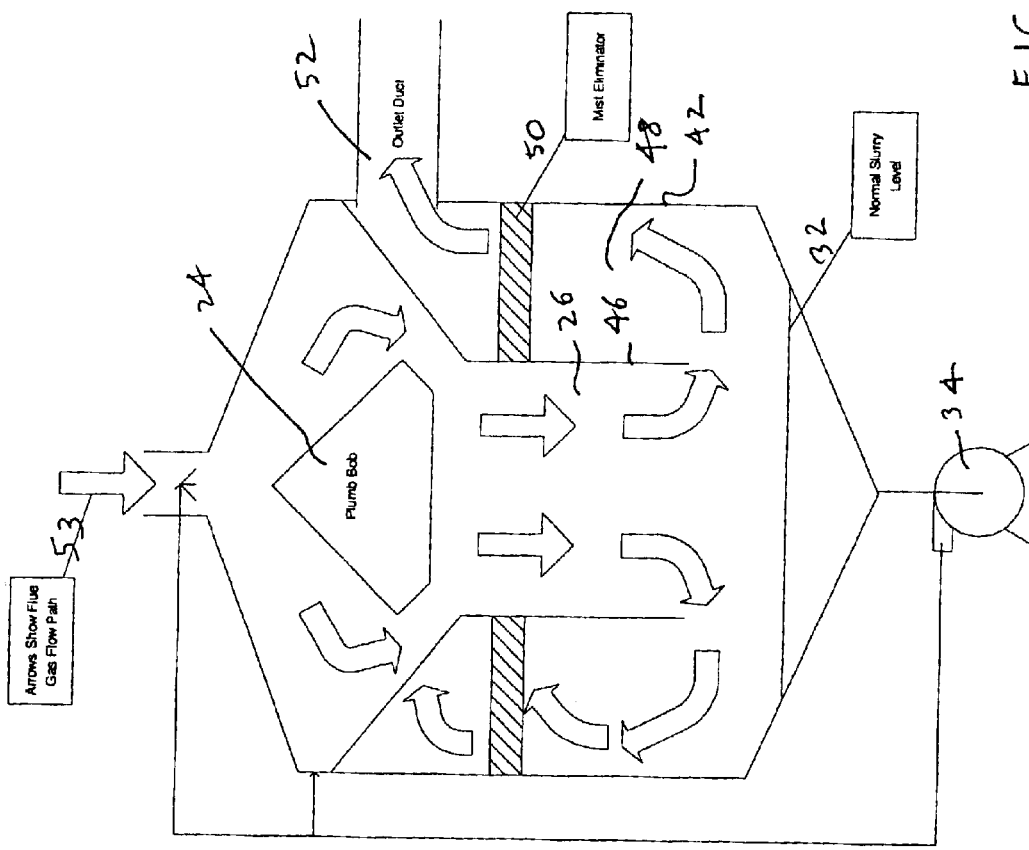
FIG. 2 is a prior art schematic cross-sectional diagram depicting the venturi scrubber portion of the FIG. 1 system in greater detail.
Figure 3:
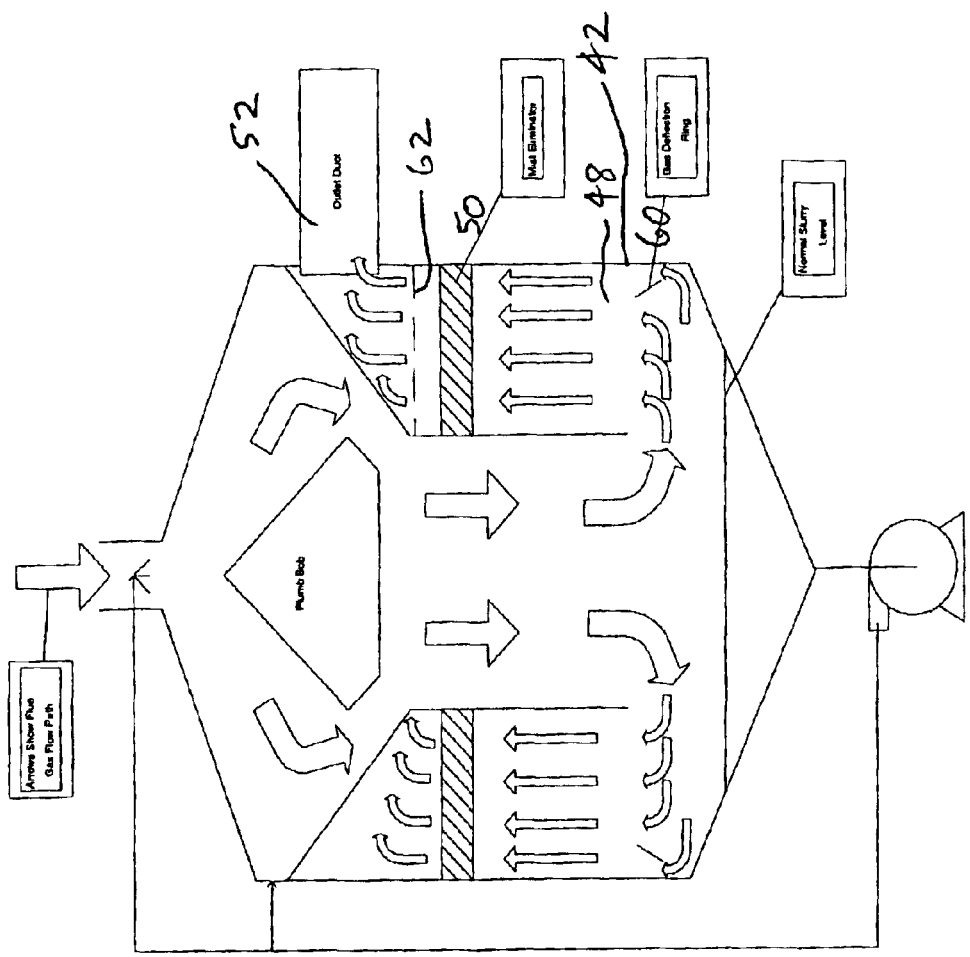
FIG. 3 is a schematic cross section similar to FIG. 2, but showing the improvements provided by the present invention.

The schematic cross-sectional view of FIG. 3 is similar to the showing of FIG. 2, except that modifications have been introduced to vessel 12 in accordance with the principles of the present invention. More specifically a gas diverter means in the preferred form of an annular ring 60 has been mounted in the annular space 48, at an axial point which is below mist eliminator 50. Ring 60 has as its function to divert or deflect the gas stream flow (arrows 53) which is thereby turned upwardly into space 48 and away from the external wall 42, whereby the velocity of the upward flow is rendered more uniform. The transverse cross-section of annular ring 60 is seen to be substantially flat so that at each lateral side of FIG. 3 the cross-section of ring 60 appears as a substantially straight line. These lines are tilted away from external wall 42 so that the cross-section converges in the upward direction. The degree of tilt of the ring cross-section is a factor in determining the degree of gas stream deflection achieved, as is the annular diameter of ring 60. The ring 60 is supported (by struts not shown) away from the wall 42. The exact spacing from wall 42 determines the amount of gas that passes between the ring and wall 42.

The redirection of the momentum of the gas stream coupled with some gas traveling up the outer wall 42 results in a much more uniform gas velocity at the mist eliminator 50. However in some venturi applications this may not be sufficient to meet velocity requirements of the mist eliminator. Thus in FIGS. 1, 2, and 3, the location of the outlet duct 52 at the side of the venturi causes the gas flow to be biased toward the outlet side. This will be evident in connection with the prior art curves of FIG. 5. To counter this a compensating means is preferably placed below the outlet duct for impeding the flow of the gas stream in at least the angular sector of the annular space underlying the outlet. This compensates for otherwise higher gas stream flow in such sector than occurs in azimuthally displaced sectors of the annular space.

Figure 1:
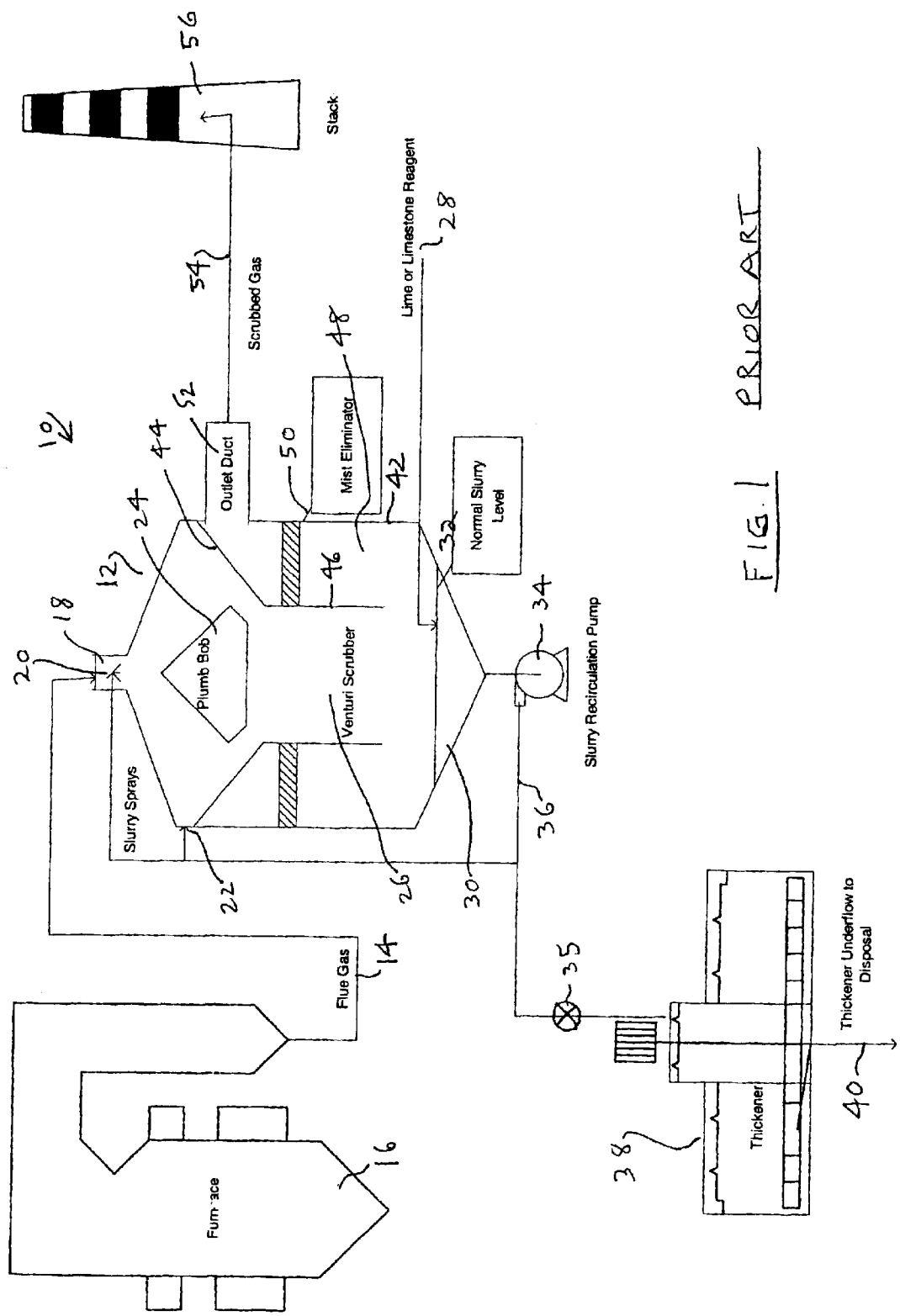
FIG. 1 is a schematic block diagram depicting a typical prior art scrubber system of the type with which the present invention may be utilized.
Figure 4:
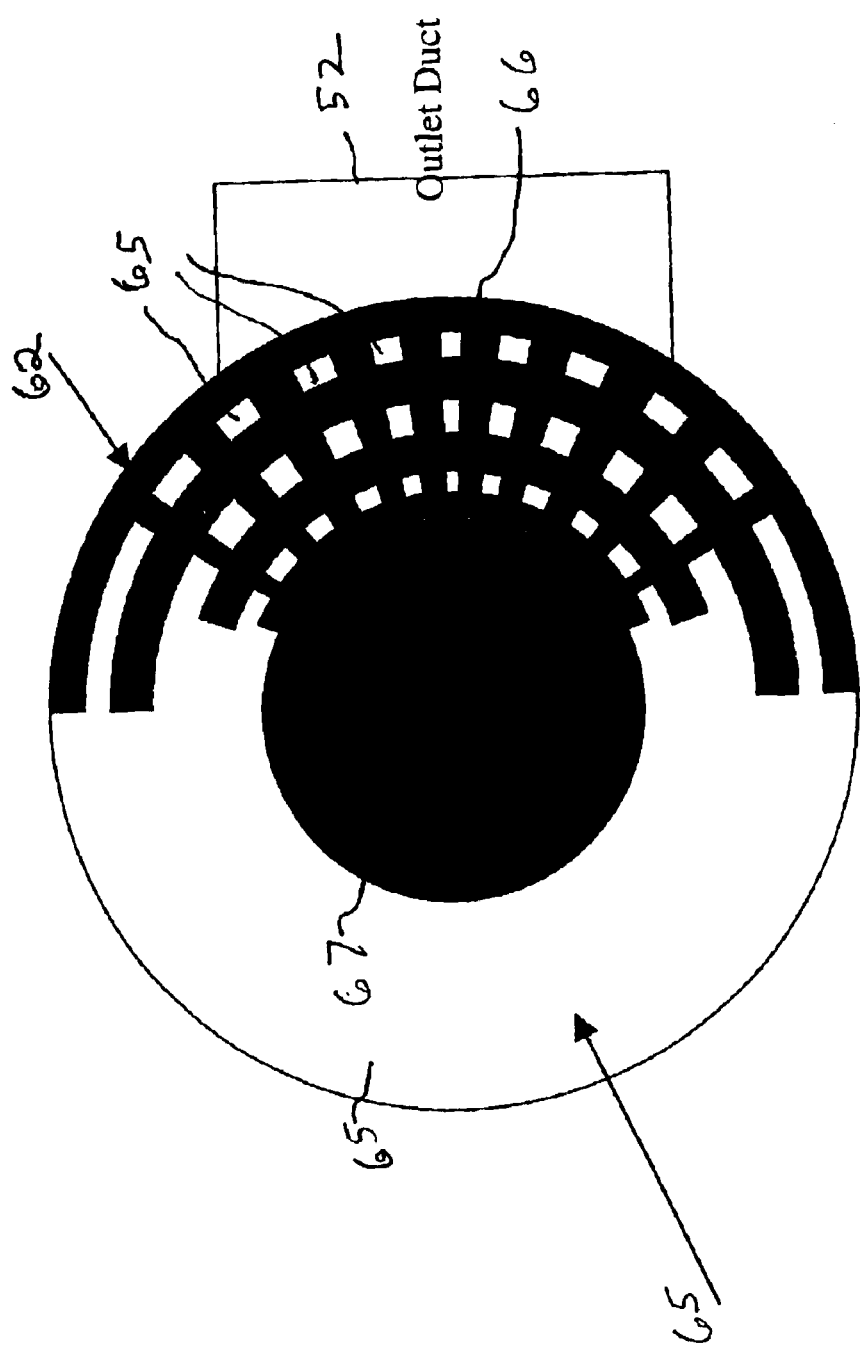
FIG. 4 is a schematic plan view of the flow compensator means of FIG. 3.

The compensating means can preferably be in the form of a plate 62 mounted above mist eliminator 50 and below outlet duct 52. A schematic plan view of plate 62 is seen in FIG. 4. The orientation of plate 62 with respect to duct 52 is also shown in this Figure. It will be appreciated from FIGS. 1 through 3 that the showing of duct 52 in FIG. 4 is actually a projection of duct 52 upon the mean plane of plate 62, in that as seen in FIGS. 1 through 3 the plane in which plate 62 resides is below that in which the duct would actually be intersected. Plate 62 is seen in these Figures to typically comprise an annular ring which is provided with areas which are open to flow and areas which are closed to gas flow. In FIG. 4 white areas 65 shown in plate 62 represent open (or perforated) areas which are open to gas stream flow, and black areas 66 represent portions of the plate 62 which are closed to such flow. The black circle 67 in the middle of the Figure schematically represents the venturi passage 26. The plate 62 is thus seen to be generally open but having a plurality of portions closed to stream flow in the angular sector of the plate underlying the projection of the duct 52 intersection, with the plate being increasingly open to gas stream flow in its sectors which are azimuthally displaced from the projected duct intersection.

Figure 5:
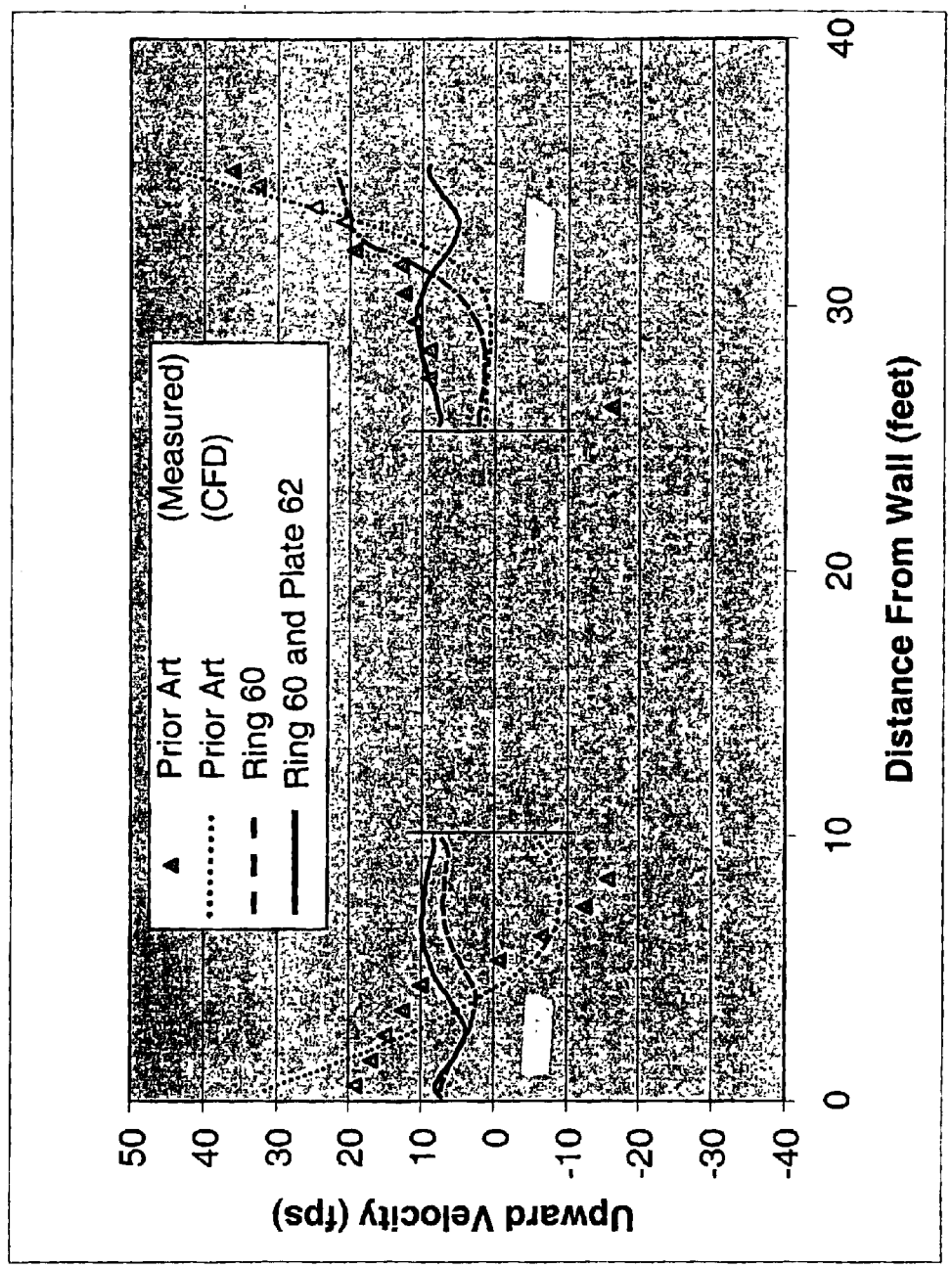
FIG. 5 is a graph depicting typical gas stream velocity profiles in the FIG. 2 prior art apparatus and in the venturi scrubber in the system of the present invention.

In FIG. 5 the dashed and solid line curves show respectively the improvements in flow uniformity that can be achieved with the invention. Assuming conditions otherwise similar to the operation of the prior art devices of FIGS. 1 and 2, the dashed line represents CFD velocity profiles where the annular ring 60 alone is added as in FIG. 4 to the prior art device of FIG. 3. Here it is seen that the flow at the left hand side of the drawing has been rendered relatively uniform, in contrast to the prior art flow otherwise shown in the Figure. However at the right-hand side of the drawing which depicts flow beneath the outlet duct 52, it is seen that the added ring 60 is by itself only partially effective in increasing uniformity. But when as shown in the solid line curve, the impeding means constituted by plate 62 is also present, the flow is not only rendered quite uniform at the left side of the annular space 48, but also at the side (at the right of the drawing) which azimuthally underlies the outlet duct 52.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the present invention.

What is claimed is:

1. A venturi scrubber for scrubbing a gas stream to remove undesired gaseous components, comprising:
   (a) a scrubber vessel having an external wall, an upper inlet for admitting said gas stream, and a collecting reservoir at the bottom of said vessel for collecting spent scrubbing liquid sprayed into the vessel;
   (b) an internal wall extending from the upper part of said external wall to define in said vessel an axial converging passage for receiving and converging the gas stream from said inlet, and an adjoined downwardly extending restricted venturi passage for receiving the downwardly flowing gas stream from said converging passage, said internal wall abounding said venturi passage terminating above the liquid level at said reservoir; and an annular space being thereby defined between said internal and external walls;
   (c) an outlet duct for the scrubbed gas stream intersecting said annular space at the upper part of said space; whereby said gas stream flowing downwardly through said converging passage and said venturi passage is turned about the bottom of said internal wall to enter said annular space and proceed therein upwardly and exit said vessel through said outlet duct;
   (d) spray means for spraying said scrubbing liquid into said gas stream for contacting said stream in at least said venturi passage;
   (e) an annular mist eliminator being mounted in said annular space at an axial point below
   (e) gas diverter means being mounted in said annular space below said mist eliminator to divert the gas stream which is turned upwardly into said annular space away from the external wall, said gas diverter means being an annular ring the transverse cross-section of which is adjacent to said external wall and which is tilted away from the wall and converses in the upward direction, whereby the upward flow through the entirety of said annular space above said diverter means to said mist eliminator is rendered more uniform; and said mist eliminator being axially spaced from said diverter means to receive said more uniform gas velocity.

2. A venturi scrubber in accordance with claim 1, further including outlet compensating means mounted in said annular space at the angular sector of said space underlying said outlet duct, for impeding the flow of said gas stream and thereby compensating for otherwise higher gas stream flow in said sector than in sectors of said annular space displaced azimuthally from the intersection of said annular space with said outlet duct, thereby rendering the upward stream flow in said annular space more uniform.

3. A venturi scrubber in accordance with claim 2, wherein said outlet compensating means comprises a plate mounted above said mist eliminator and below said outlet duct, said plate being generally open but having a plurality of portions closed to gas stream flow in the sector underlying the duct intersection with said annular space, and said plate being increasingly open to stream flow in its sectors which are azimuthally displaced from said duct intersection.

4. A venturi scrubber in accordance with claim 3, wherein said plate is an annular ring.

5. In a venturi scrubber for scrubbing a gas stream to remove undesired gaseous components, of the type including a venturi channel bounded by a first wall, through which channel the gas stream flows while being contacted with a scrubbing slurry; an annular flow space surrounding said venturi channel between said first wall and a second wall spaced from said first wall; said annular space being in communication with said venturi channel so that said gas stream exiting from said venturi channel is reentrant into said annular space and flows therein in a direction opposite that for the gas stream flow in said venturi passage; a gas stream outlet communicating with said annular flow space; and a mist eliminator in said annular space upstream of said outlet; the improvement comprising:

gas diverter means in said annular space upstream of said mist eliminator to divert the gas stream which flows into said space from said venturi channel away from said second wall, said gas diverter means being an annular ring the transverse cross-section of which is adjacent to said second wall and which is tilted away from the second wall and converges in the downstream direction of said gas stream flow, whereby the flow through the entirety of said annular space above said diverter means to said mist eliminator is rendered more uniform; and said mist eliminator being axially spaced from said diverter means to receive said more uniform gas velocity.

6. A venturi scrubber in accordance with claim 5, further including outlet compensating means mounted in said annular space upstream of said outlet, for impeding the flow of said gas stream toward said outlet and thereby compensating for otherwise higher gas stream flow in portions of said annular space which are azimuthally aligned with said outlet, hereby rendering the stream flow in said annular space more uniform.

7. A venturi scrubber in accordance with claim 6, wherein said outlet compensating means comprises a plate mounted upstream of said mist eliminator, said plate having a plurality of portions closed to gas stream flow in the said azimuthally aligned portions of said annular space; and said plate being increasingly open to stream flow in its angular sectors which are azimuthally displaced from said aligned portions.

8. A venturi scrubber in accordance with claim 7, wherein said plate is an annular ring.

* * * * *